United States Patent
Dave

(10) Patent No.: US 10,419,328 B1
(45) Date of Patent: Sep. 17, 2019

(54) APPARATUS, SYSTEM, AND METHOD FOR IMPROVED MEMORY CONSUMPTION IN NETWORK DEVICES VIA EFFICIENT ROUTE MANAGEMENT

(71) Applicant: Juniper Networks, Inc., Sunnyvale, CA (US)

(72) Inventor: Hiren Bhalchandra Dave, Fremont, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 12 days.

(21) Appl. No.: 15/484,475

(22) Filed: Apr. 11, 2017

(51) Int. Cl.
*H04L 12/755* (2013.01)
*H04L 12/707* (2013.01)
*H04L 12/705* (2013.01)
*H04L 12/721* (2013.01)
*H04L 12/803* (2013.01)
*H04L 12/741* (2013.01)
*H04L 29/08* (2006.01)

(52) U.S. Cl.
CPC ............ *H04L 45/021* (2013.01); *H04L 45/18* (2013.01); *H04L 45/24* (2013.01); *H04L 45/38* (2013.01); *H04L 45/745* (2013.01); *H04L 47/125* (2013.01); *H04L 67/10* (2013.01)

(58) Field of Classification Search
CPC ..... H04L 45/021; H04L 67/10; H04L 45/745; H04L 47/125; H04L 45/18; H04L 45/24; H04L 45/38

USPC .................................................. 370/392, 400
See application file for complete search history.

(56) References Cited

U.S. PATENT DOCUMENTS

| | | | |
|---|---|---|---|
| 2009/0037601 A1* | 2/2009 | Jain ......................... | H04L 12/66 709/242 |
| 2010/0080228 A1* | 4/2010 | Kwapniewski ......... | H04L 45/00 370/392 |
| 2016/0248657 A1* | 8/2016 | Kasiviswanathan .... | H04L 45/02 |
| 2017/0302578 A1* | 10/2017 | Gattani ................ | H04L 45/7453 |
| 2018/0109450 A1* | 4/2018 | Filsfils .................... | H04L 45/74 |

\* cited by examiner

*Primary Examiner* — Kwang B Yao
*Assistant Examiner* — Syed M Bokhari
(74) *Attorney, Agent, or Firm* — FisherBroyles, LLP

(57) ABSTRACT

The disclosed computer-implemented method may include (1) receiving, at a network device, a route update for one or more routes that direct traffic within a network that supports BGP, (2) identifying, within the route update, a BGP prefix and a plurality of protocol next-hop addresses that (A) identify a plurality of neighbors of the network device and (B) each correspond to the BGP prefix, (3) maintaining a single copy of the BGP prefix and each of the protocol next-hop addresses, (4) receiving a packet destined for a computing device that is reachable via at least one of the neighbors of the network device, and then (5) forwarding the packet to the one of the neighbors of the network device in accordance with the BGP prefix and the protocol next-hop address that identifies the one of the neighbors. Various other methods, systems, and apparatuses are also disclosed.

15 Claims, 7 Drawing Sheets

APPARATUS, SYSTEM, AND METHOD FOR IMPROVED MEMORY CONSUMPTION IN NETWORK DEVICES VIA EFFICIENT ROUTE MANAGEMENT

BACKGROUND

MultiProtocol Label Switching (MPLS) networks often include multiple paths that facilitate the flow of traffic from a source to a destination. In such MPLS networks, some network devices may have the same Border Gateway Protocol (BGP) prefix but distinguish themselves from one another by differing protocol next-hop addresses. These network devices and/or supporting BGP controllers or route reflectors may advertise the respective routes, which each include the same BGP prefix but a different protocol next-hop address.

As a specific example, an MPLS network may include various edge routers and 12 Equal-Cost Multi-Path (ECMP) paths. In this example, these ECMP paths may share the BGP prefix "100.1.1.1" but have 12 different protocol next-hop addresses ranging from "1.1.1.1" to "1.1.1.12". In a traditional configuration, the edge routers may need to maintain 12 copies of the same prefix—one for each route. However, since the Internet may include more than 500,000 routes, the edge routers may maintain each of these 12 copies of the same prefix in connection with the more 500,000 Internet routes, thereby leading to a significant memory management burden for the edge routers.

Moreover, the edge routers may need to update and/or manage their routing tables on a fairly regular basis to account for topology changes and/or system faults (among other reasons). Unfortunately, this update process may consume a significant amount of resources on the edge routers and add to the existing memory management burden. The instant disclosure, therefore, identifies and addresses a need for improved apparatuses, systems, and methods for improved memory consumption in network devices via efficient route management.

SUMMARY

As will be described in greater detail below, the instant disclosure generally relates to apparatuses, systems, and methods for improved memory consumption in network devices via efficient route management. In one example, a computer-implemented method for improved memory consumption in network devices via efficient route management may include (1) receiving, at a network device, a route update for one or more routes that direct traffic within a network that supports BGP, (2) identifying, within the route update, a BGP prefix and a plurality of protocol next-hop addresses that (A) identify a plurality of neighbors of the network device and (B) each correspond to the BGP prefix, (3) maintaining, at the network device, a single copy of the BGP prefix and each of the protocol next-hop addresses instead of maintaining a different copy of the BGP prefix for each of the protocol next-hop addresses, (4) receiving, at the network device, a packet destined for a computing device that is reachable via at least one of the neighbors of the network device, and then (5) forwarding the packet to the one of the neighbors of the network device in accordance with the BGP prefix and the protocol next-hop address that identifies the one of the neighbors.

As another example, a system for implementing the above-described method may include various modules stored in memory. The system may also include at least one physical processor that executes these modules. For example, the system may include (1) a receiving module that receives a route update for one or more routes that direct traffic within a network that supports BGP, (2) an identification module that identifies, within the route update, a BGP prefix and a plurality of protocol next-hop addresses that (A) identify a plurality of neighbors of the network device and (B) each correspond to the BGP prefix, (3) a maintenance module that maintains a single copy of the BGP prefix and each of the protocol next-hop addresses instead of maintaining a different copy of the BGP prefix for each of the protocol next-hop addresses, (4) wherein the receiving module receives a packet destined for a computing device that is reachable via at least one of the neighbors of the network device, and (5) a forwarding module that forwards the packet to the one of the neighbors of the network device in accordance with the BGP prefix and the protocol next-hop address that identifies the one of the neighbors.

As a further example, an apparatus for implementing the above-described method may include (1) at least one storage device that stores a routing table for a network device and (2) at least one physical processing device that is communicatively coupled to the storage device at the network device, wherein the physical processing device (A) receives a route update for one or more routes that direct traffic within a network that supports BGP, (B) identifies, within the route update, a BGP prefix and a plurality of protocol next-hop addresses that (I) identify a plurality of neighbors of the network device and (II) each correspond to the BGP prefix, (C) maintains a single copy of the BGP prefix and each of the protocol next-hop addresses instead of maintaining a different copy of the BGP prefix for each of the protocol next-hop addresses, (D) receives a packet destined for a computing device that is reachable via at least one of the neighbors of the network device and then (E) forwards the packet to the one of the neighbors of the network device in accordance with the BGP prefix and the protocol next-hop address that identifies the one of the neighbors.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
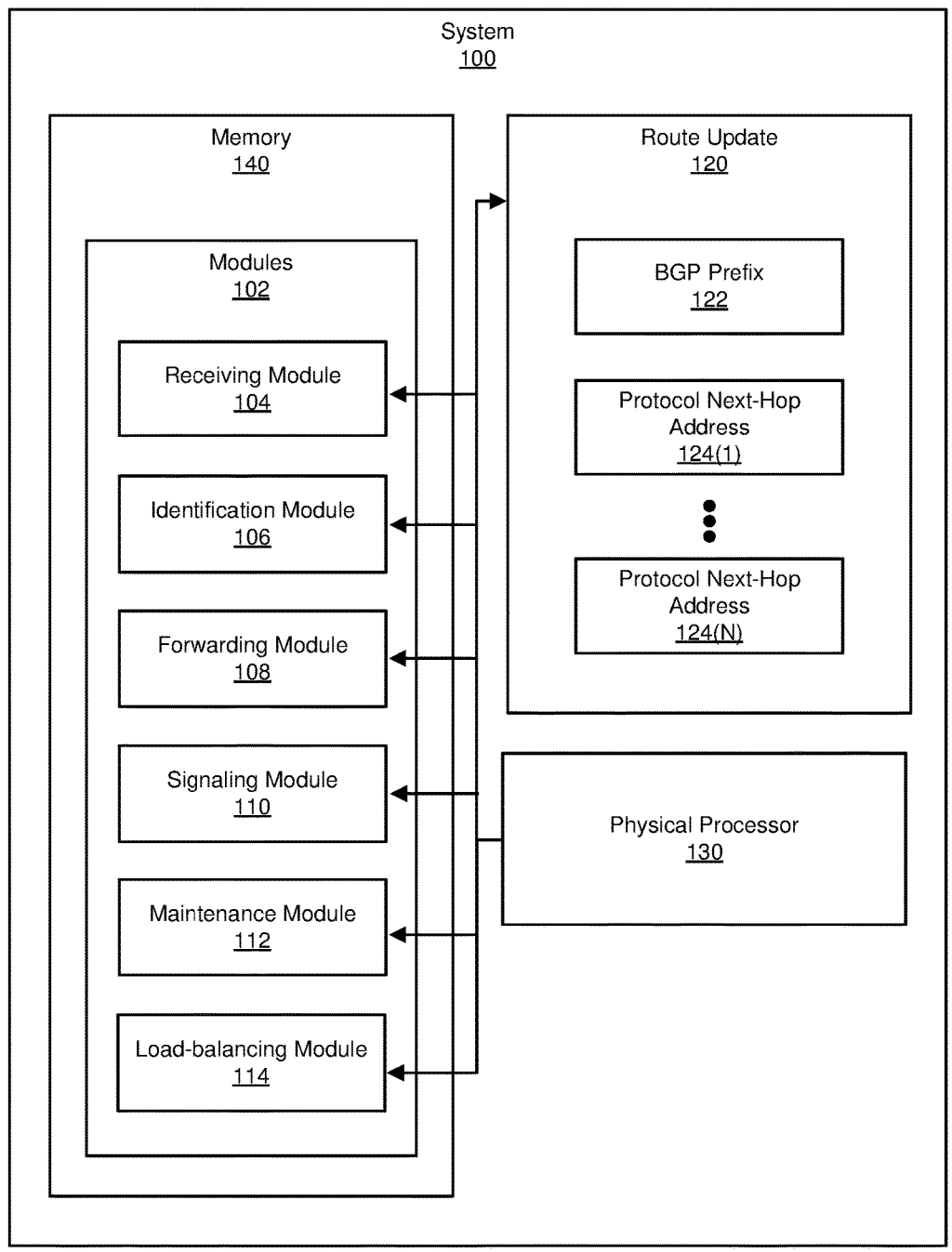
FIG. 1 is a block diagram of an exemplary system for improved memory consumption in network devices via efficient route management.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for improved memory consumption in network devices via efficient route management. As will be explained in greater detail below, by collecting routes that correspond to ECMP paths within MPLS networks at a route reflector and/or BGP controller, the various apparatuses, systems, and methods described herein may be able to build and/or advertise route updates that include a single BGP prefix with multiple protocol next-hop addresses that correspond to neighbors of a router. These apparatuses, systems, and methods may then direct the route reflector and/or controller to send the route update to that router to account for any topology changes and/or system faults capable of disrupting traffic.

The router may then store and/or maintain a single copy of the BGP prefix in connection with the multiple protocol next-hop addresses instead of maintaining a different copy of the BGP prefix for each of the protocol next-hop addresses included in the route update. By doing so, the router may be able to drastically reduce memory and/or resource consumption stemming from the route updates and/or management when compared to traditional route management schemes.

The following will provide, with reference to FIGS. 1, 2, 5, and 6, detailed descriptions of exemplary systems and/or implementations for improved memory consumption in network devices via efficient route management. Detailed descriptions of corresponding computer-implemented methods will be provided in connection with FIG. 3. Detailed descriptions of an exemplary route update will be provided in connection with FIG. 4. In addition, detailed descriptions of an exemplary computing system for carrying out these methods will be provided in connection with FIG. 7.

FIG. 1 is a block diagram of an exemplary system 100 for improved memory consumption in network devices via efficient route management. As illustrated in this figure, exemplary system 100 may include one or more modules 102 for performing one or more tasks. As will be explained in greater detail below, modules 102 may include a receiving module 104, an identification module 106, a forwarding module 108, a signaling module 110, a maintenance module 112, and a load-balancing module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network devices 202 and 208), the devices illustrated in FIG. 5 (e.g., route reflector 502 and routers 504(1)-(N)), and/or the devices illustrated in FIG. 6 (e.g., route reflector 602, router 604, and router 606). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate improved memory consumption in network devices via efficient route management. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more route updates, such as route update 120. In some examples, route update 120 may include a BGP prefix 122 and next-hop addresses 124(1)-(N). In these examples, route update 120 may be sent and/or advertised to one or more network devices within an MPLS network to enable those network devices to forward traffic along certain routes.

Figure 2:
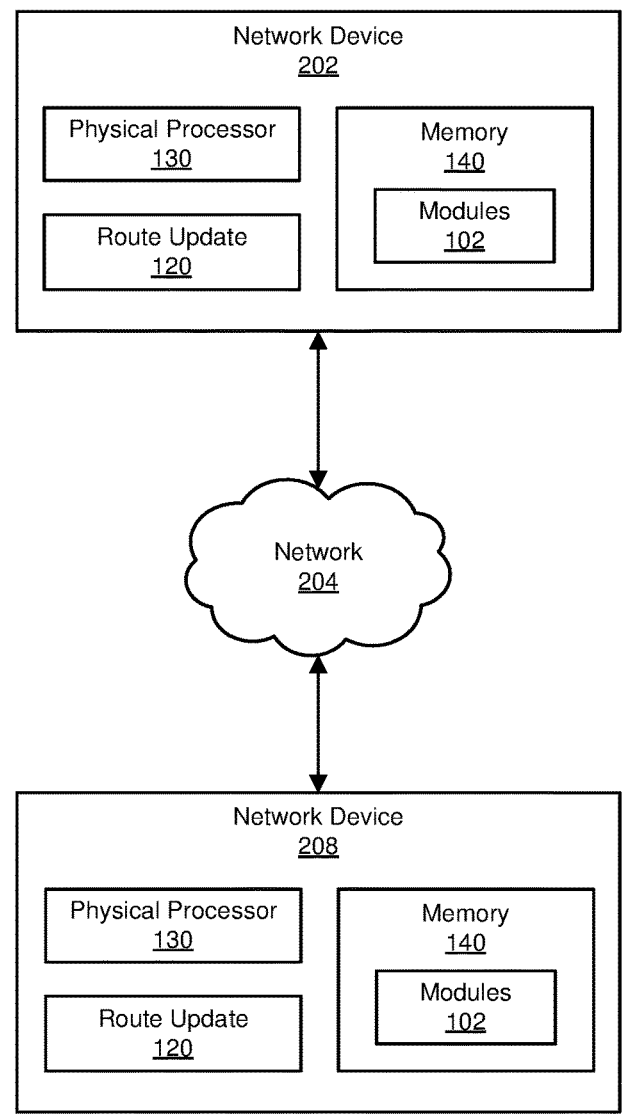
FIG. 2 is a block diagram of an additional exemplary system for improved memory consumption in network devices via efficient route management.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 in communication with a network device 208 via a network 204. In one example, all or a portion of the functionality of modules 102 may be performed by network device 202, network device 208, and/or any other suitable computing device. As will be described in greater detail below, one or more of modules 102 from FIG. 1 may, when executed by at least one processor of network device 202 and/or network device 208, enable that network device to facilitate improved memory consumption in network devices via efficient route management.

Network devices 202 and 208 each generally represent any type or form of physical computing device that forwards traffic within a network. In one example, one or more of network devices 202 and 208 may include and/or represent a router, such as a Customer Edge (CE) router, a Provider Edge (PE) router, a hub router, a spoke router, an AS boundary routers, and/or area border routers. In this example, one or more of network devices 202 and 208 may include and/or represent a route reflector and/or a controller (such as a BGP controller). In this example, the router may be located at and/or included in a data center. Additional examples of network devices 202 and 208 include, without limitation, Packet Forwarding Engines (PFEs), Routing Engines (REs), line cards, switches, hubs, modems, bridges, repeaters, gateways, portions of one or more of the same, combinations or variations of one or more of the same, and/or any other suitable network devices. Although FIG. 2 illustrates only two network devices, other embodiments may involve and/or incorporate various additional network devices.

Network 204 generally represents any medium or architecture capable of facilitating communication or data transfer. In one example, network 204 may facilitate communication between network devices 202. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, portions of one or more of the same, variations or combinations of one or more of the same, and/or any other suitable network. Although illustrated as being external to network 204 in FIG. 2, network devices 202 and 208 may each represent a portion of network 204 and/or be included in network 204.

Figure 3:
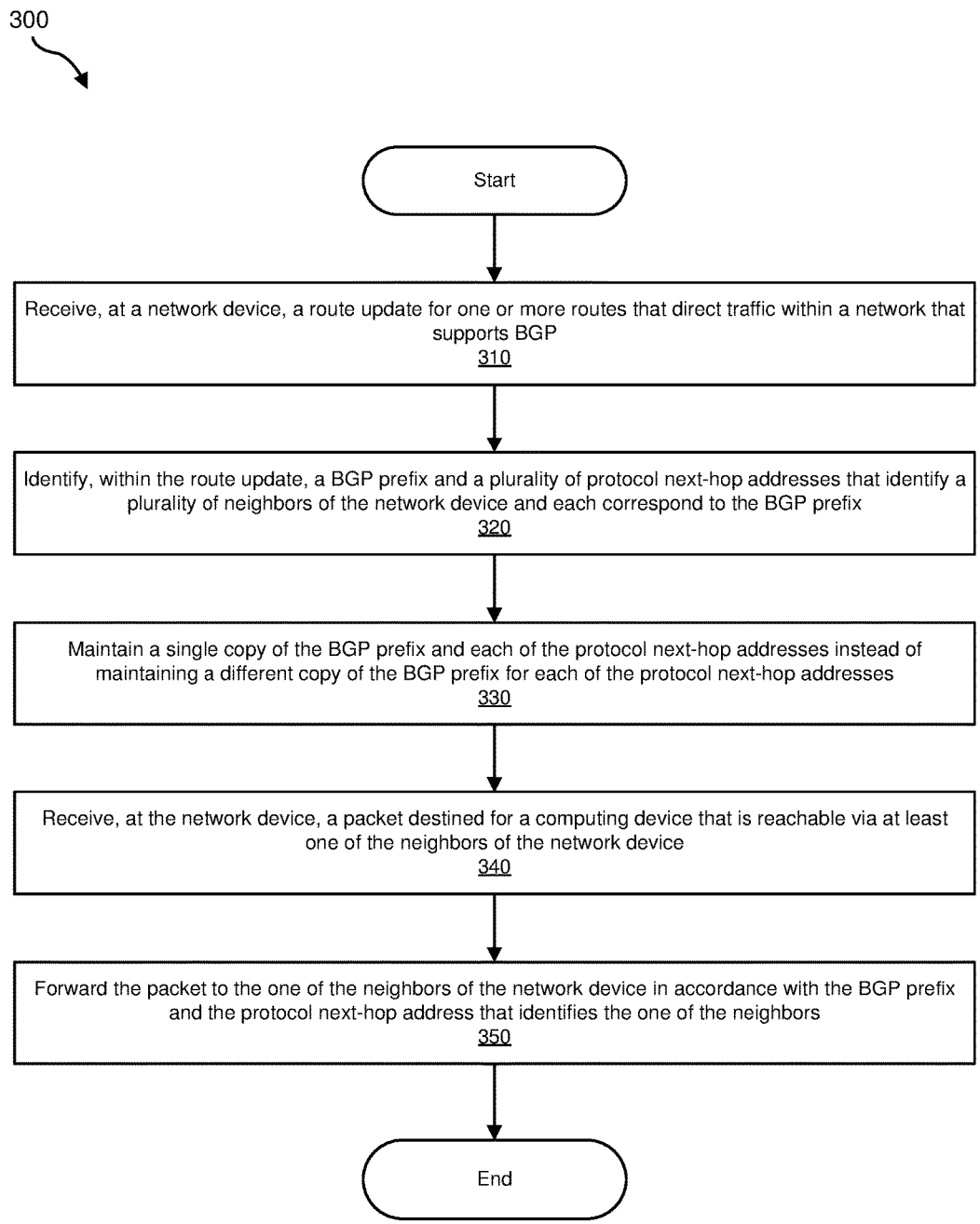
FIG. 3 is a flow diagram of an exemplary method for improved memory consumption in network devices via efficient route management.
Figure 4:
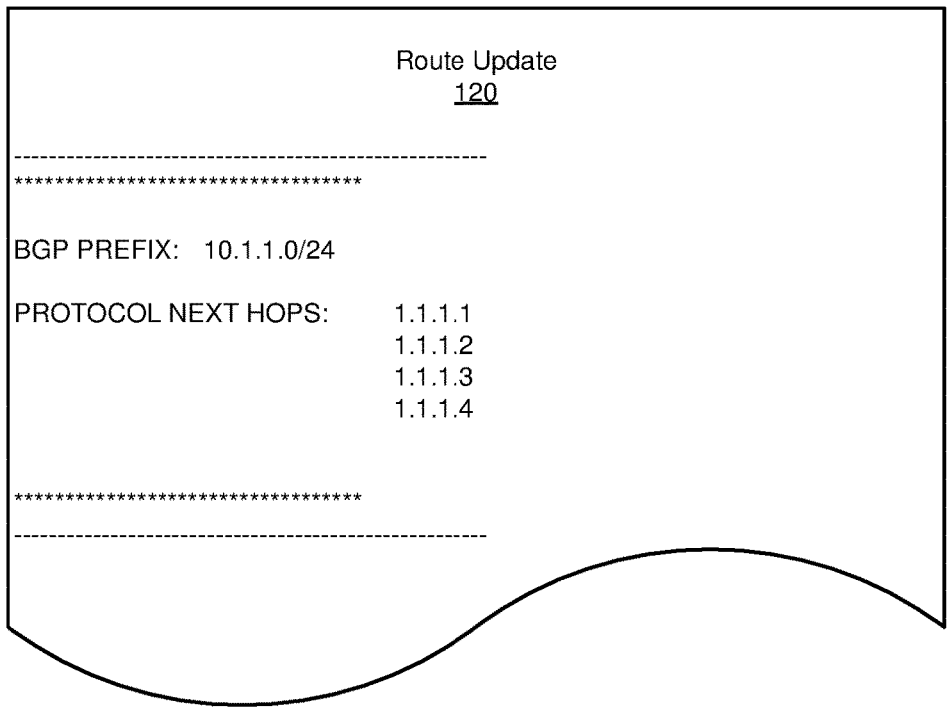
FIG. 4 is an illustration of an exemplary route update that includes a BGP prefix and multiple protocol next-hop addresses.

FIG. 3 is a flow diagram of an example computer-implemented method 300 for improved memory consumption in network devices via efficient route management. The steps shown in FIG. 3 may be performed by any suitable computer-executable code and/or computing system, including system 100 in FIG. 1, system 200 in FIG. 2, AS 500 in FIG. 5, ASs 608(1)-(3) in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive a route update for one or more routes that direct traffic within a network that supports BGP. For example, receiving module 104 may, as part of network device 202 in FIG. 2, receive a route update for one or more routes that direct traffic within network 204 or another network that supports BGP. In this example, the route update may be configured to update and/or modify one or more existing routes within the network. Additionally or alternatively, the route update may be configured to add one or more new routes within the network.

The systems described herein may perform step 310 in a variety of different ways and/or contexts. In some examples, receiving module 104 may detect and/or identify the route update as the route update arrives at network device 202. In one example, network device 208 may send the route update to network device 202 via network 204. For example, signaling module 110 may, as part of network device 208, signal the route update to network device 202 via network 204. In this example, as the route update arrives at network device 202, receiving module 104 may receive the route update from network device 208.

In some examples, signaling module 110 may build, create, generate, and/or modify the route update prior to sending the same to network device 202. In other examples, signaling module 110 may simply relay the route update from another device to network device 202.

In some examples, signaling module 110 may remove certain route information from the route update to prevent routing loops in external BGP (eBGP) configurations and/or situations. For example, signaling module 110 may strip, delete, and/or omit all information that identifies the AS paths related to the routes from the route update prior to sending the route update to network device 202. Alternatively, signaling module 110 may strip, delete, and/or omit all such route information with one exception from the route update prior to sending the route update to network device 202. In particular, signaling module 110 may leave intact and/or insert the route information that identifies the best and/or preferred AS path among the routes included in the route update. In other words, signaling module 110 may remove route information that identifies all the AS paths except for the best and/or preferred AS path.

In some examples, signaling module 110 may send the route update to multiple network devices. For example, signaling module 110 may direct network device 208 to send the route update to a network device in a first data center. In this example, signaling module 110 may also direct network device 208 to send the route update to another network device in a second data center. Accordingly, signaling module 110 may direct network device 208 to send the route update to network devices spanning multiple data centers.

Returning to FIG. 3, at step 320 one or more of the systems described herein may identify, within the route update, a BGP prefix and a plurality of protocol next-hop addresses that identify a plurality of neighbors of the network device. For example, identification module 106 may, as part of network device 202 in FIG. 2, identify a single BGP prefix 122 and protocol next-hop addresses 124(1)-(N) within the route update. In this example, each of the protocol next-hop addresses may identify and/or correspond to a different neighbor of network device 202 (e.g., a device that neighbors network device 202 and/or a device that has a BGP neighborship with network device 202). In other words, each combination of BGP prefix and protocol next-hop address may identify a different ECMP path to a certain destination by way of that neighbor.

The systems described herein may perform step 320 in a variety of different ways and/or contexts. In some examples, identification module 106 may search the route update for the BGP prefix and/or protocol next-hop addresses. For example, identification module 106 may search route update 120 in FIG. 4. During this search, identification module 106 may identify BGP prefix "10.1.1.0/24" and protocol next-hop addresses "1.1.1.1", "1.1.1.2", "1.1.1.3", and "1.1.1.4". In this example, each of these protocol next-hop addresses may identify and/or correspond to a different BGP neighbor of network device 202.

Returning to FIG. 3, at step 330 one or more of the systems described herein may maintain a single copy of the BGP prefix and each of the protocol next-hop addresses instead of maintaining a different copy of the BGP prefix for each of the protocol next-hop addresses. For example, maintenance module 112 may, as part of network device 202 in FIG. 2, maintain a single copy of the BGP prefix and each of the next-hop addresses instead of maintaining a different copy of the BGP prefix for each of the protocol next-hop addresses. By maintaining the single copy of the BGP prefix in this way, maintenance module 112 may be able to improve memory and/or resource consumption stemming from the route update and/or route management when compared to traditional route update and/or management schemes.

The systems described herein may perform step 330 in a variety of different ways and/or contexts. In some examples, maintenance module 112 may install a single copy of the BGP prefix and each of the protocol next-hop addresses in a routing table of network device 202. For example, maintenance module 112 may install a single copy of the BGP prefix "10.1.1.0/24" along with protocol next-hop addresses "1.1.1.1", "1.1.1.2", "1.1.1.3", and "1.1.1.4" in the routing table. In this example, each of these protocol next-hop addresses may correspond to that single copy of the BGP prefix. Accordingly, maintenance module 112 may avoid installing multiple copies of the BGP prefix in that routing table and/or ensure that the routing table does not include multiple copies of that BGP prefix.

In some examples, network device 202 may include and/or incorporate multiple routing and/or forwarding tables. In such examples, maintenance module 112 may populate each of those routing tables with only a single copy of the BGP prefix. For example, network device 202 may include a routing engine that has a routing table, and a packet forwarding engine that has another routing table and/or a forwarding table. In this example, maintenance module 112 may install a single copy of the BGP prefix in each of the routing tables and/or the forwarding table. However, maintenance module 112 may avoid installing multiple copies of the BGP prefix in any of the routing tables and/or forwarding table.

Returning to FIG. 3, at step 340 one or more of the systems described herein may receive a packet destined for a computing device that is reachable via at least one of the neighbors of the network device. For example, receiving module 104 may, as part of network device 202 in FIG. 2, receive a packet destined for a computing device (not necessarily illustrated in FIG. 2) that is reachable via at least one of the neighbors (not necessarily illustrated in FIG. 2) of network device 202. The term "packet," as used herein, generally refers to any type or form of communication and/or message that is sent and/or received by a computing device.

The systems described herein may perform step 340 in a variety of different ways and/or contexts. In some examples, receiving module 104 may monitor the control plane and/or the data plane at network device 202. While monitoring the data plane, receiving module 104 may receive the packet from a computing device. In this example, the packet may be destined for another computing device that is reachable via one of the ECMP paths represented by and/or associated with the routes included in the route update.

Returning to FIG. 3, at step 350 one or more of the systems described herein may forward the packet to the one of the neighbors of the network device in accordance with the BGP prefix and the protocol next-hop address that identifies the one of the neighbors. For example, forwarding module 108 may, as part of network device 202 in FIG. 2, forward the packet to the one of the neighbors in accordance with the BGP prefix and the protocol next-hop address of that neighbor. In this example, the neighbor may represent the next hop of the packet on the way to its final destination. Alternatively, the neighbor may represent the final destination itself.

The systems described herein may perform step 350 in a variety of different ways and/or contexts. In some examples, forwarding module 108 may direct network device 202 to send the packet to the neighbor. In such examples, the packet may arrive at the neighbor on the way to its final destination. Alternatively, the packet may reach the neighbor and finish traversing the MPLS network.

In some examples, one or more of the systems described herein may perform load-balancing on the traffic. For example, load-balancing module 114 may, as part of network device 202 in FIG. 2, perform an ECMP routing operating on traffic exiting network device 202 to facilitate load balancing. In this example, network device 202 may include and/or represent a router running at a data center. The router may load-balance the traffic by way of ECMP routing operations. Accordingly, forwarding module 108 may forward the packet to the BGP neighbor of the router in accordance with the ECMP routing operations.

Figure 5:
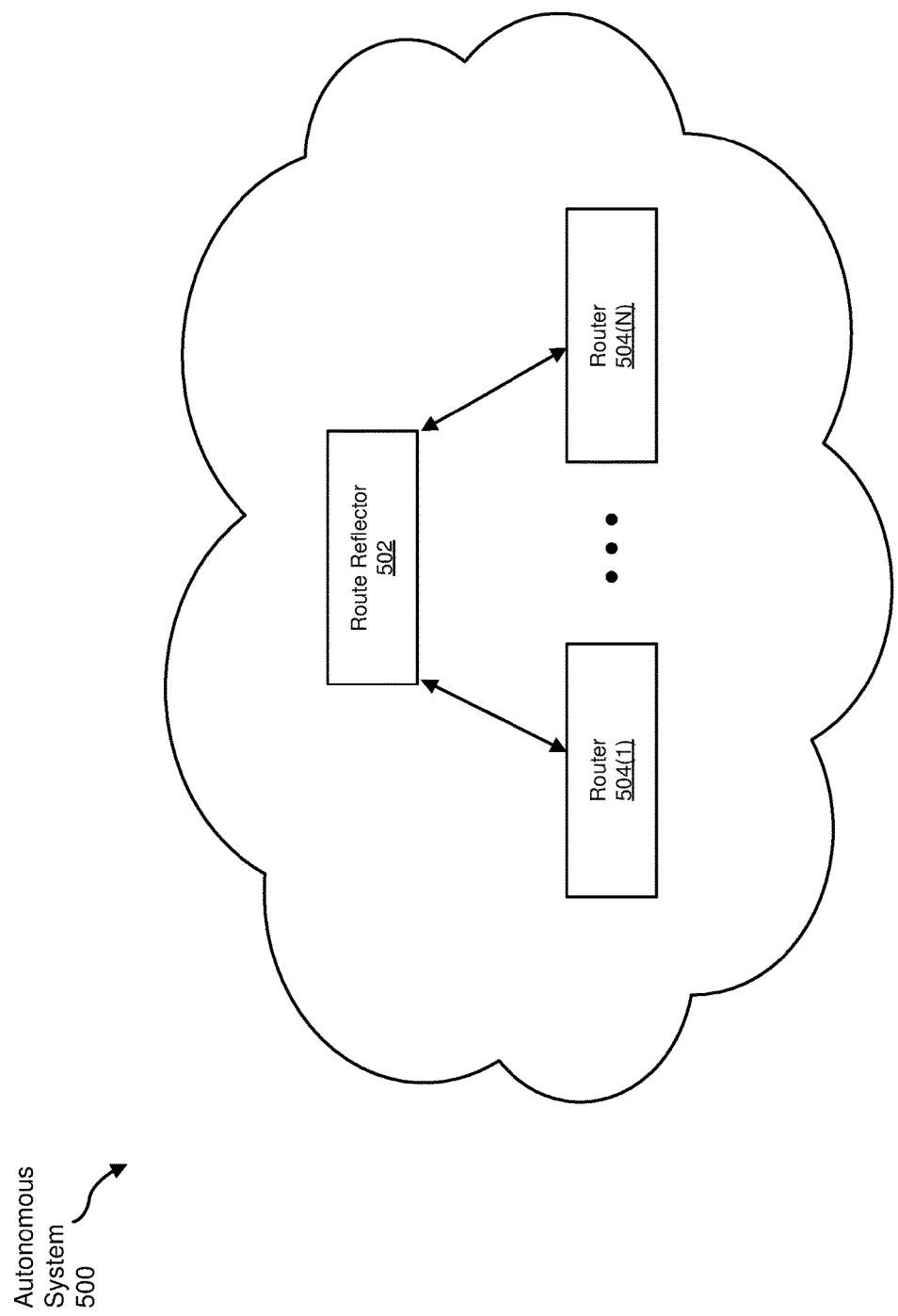
FIG. 5 is a block diagram of an exemplary Autonomous System (AS) that includes a route reflector and multiple routers.

The systems described herein may be configured and/or arranged in various network topologies. In one example, these systems may be implemented as an AS 500 in FIG. 5. As illustrated in FIG. 5, AS 500 may include and/or represent a route reflector 502 in communication with routers 504(1)-(N). In this example, route reflector 502 may send route update 120 to one or more of routers 504(1)-(N).

Figure 6:
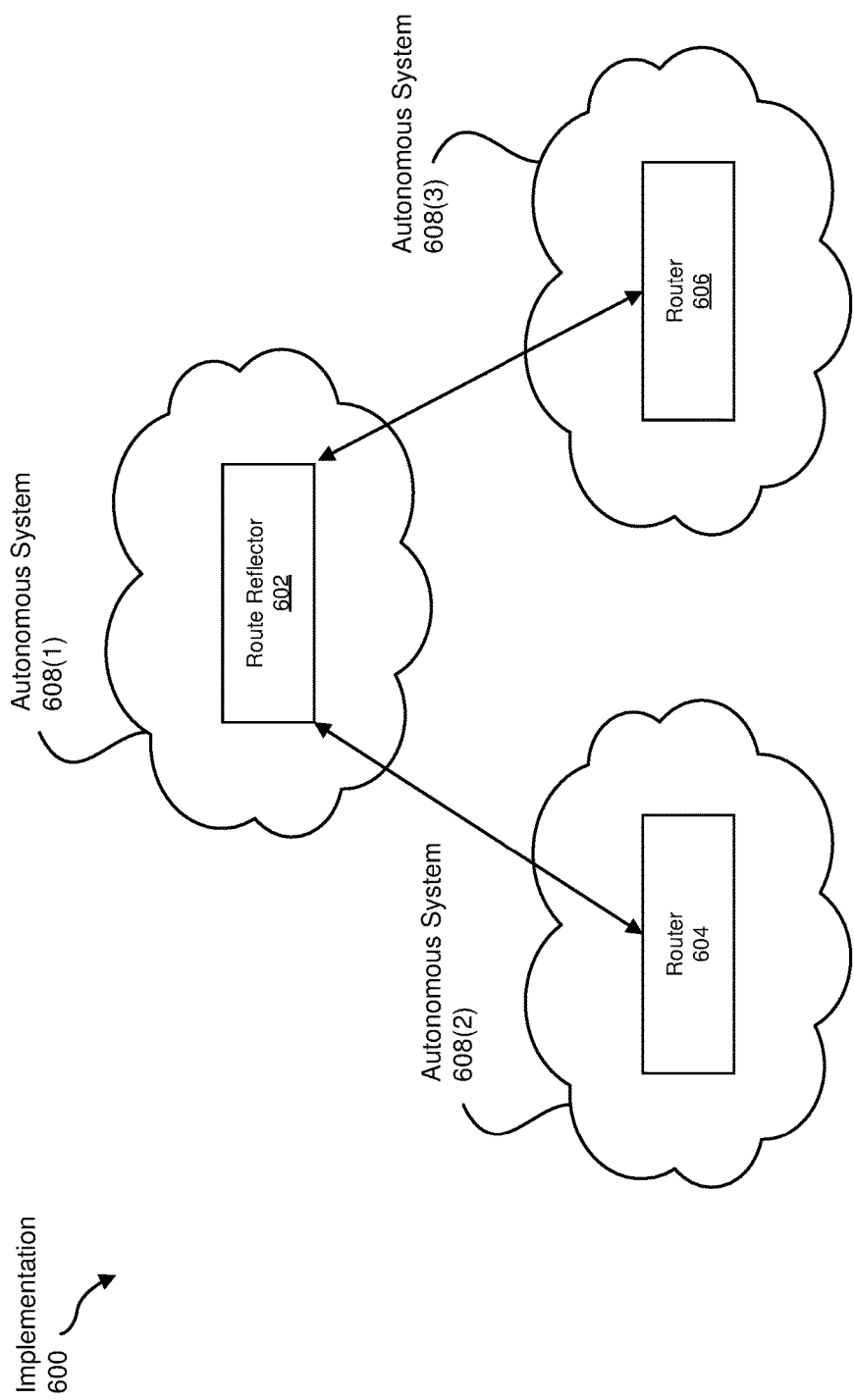
FIG. 6 is a block diagram of an exemplary implementation of ASes for improved memory consumption in network devices via efficient route management.

In another example, these systems may be deployed as implementation 600 in FIG. 6. As illustrated in FIG. 6, implementation 600 may include and/or represent ASs 608(1), 608(2), and 608(3) in communication with one another. In this example, AS 608(1) may include a route reflector 602, AS 608(2) may include a router 604, and AS 608(3) may include a router 606. Route reflector 602 may send route update 120 to one or more of routers 604 and 606.

In one example, route reflector 602 may remove certain route information from the route update to prevent routing loops since implementation 600 includes and/or represents an eBGP configuration and/or situation. For example, in the event that route reflector 602 is sending a route update to router 604 in AS 608(2), route reflector 602 may remove all route information that identifies the AS path that leads to AS 608(2) from the route update. In this example, route reflector 602 may determine that the route update is destined for router 604 in AS 608(2). In response to this determination, route reflector 602 may remove all route information that identifies the AS path that leads to AS 608(2) from the route update prior to sending the same to router 604. By doing so, route reflector 602 may prevent a routing loop in which router 604 attempts to send traffic via the AS path that leads to AS 608(2).

The systems described herein may monitor and/or track the traffic traversing an MPLS network in a variety of ways and/or contexts. For example, route reflector 602 may establish a BGP neighborship with a flow-monitoring server (not necessarily illustrated in FIG. 6). In this example, route reflector 602 may advertise various routes that lead to a common destination with at least one corresponding AS path to the flow-monitoring server. These routes may include and/or identify the BGP prefix and corresponding protocol next-hop addresses. By doing so, route reflector 602 may enable the flow-monitoring server to create at least one flow record in connection with the routes.

Continuing with this example, the flow-monitoring server may obtain the Internet Protocol (IP) address of the destination of those routes from router 604. The flow-monitoring server may then identify the AS path to which those routes correspond. Upon identifying that AS path, the flow-monitoring server may create the flow record based at least in part on the destination IP address of the routes and the AS path to which the routes correspond. By creating the flow record in this way, the flow-monitoring server may monitor and/or track traffic destined for the destination IP address based at least in part on the flow record. For example, the flow-monitoring server may build and/or maintain statistics about the amount of traffic destined for that destination IP address.

Figure 7:
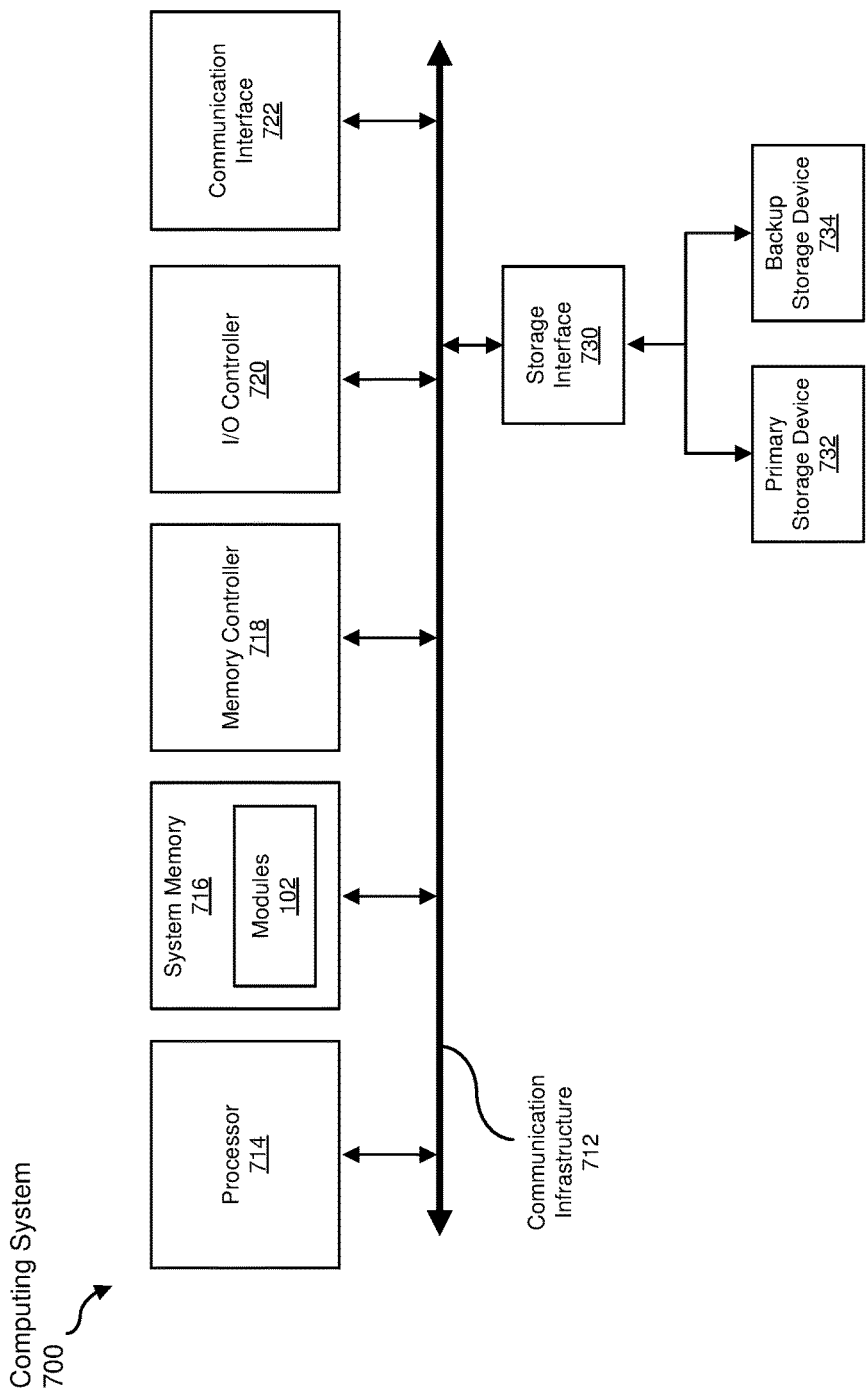
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include and/or store all or a portion of modules 102 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    receiving, at a network device from another network device, a route update for one or more routes that direct traffic within a network that supports Border Gateway Protocol (BGP), wherein the other network device:
        determines that the network device is included in a first Autonomous System (AS) and the other network device in a second AS; and
        removes, from the route update, route information that identifies at least one AS path that is related to the routes and leads to the first AS;
        sends the route update to the network device upon removing the route information from the route update;
    identifying, within the route update, a BGP prefix and a plurality of protocol next-hop addresses that:
        identify a plurality of neighbors of the network device; and
        each correspond to the BGP prefix;
    maintaining, at the network device, a single copy of the BGP prefix and each of the protocol next-hop addresses instead of maintaining a different copy of the BGP prefix for each of the protocol next-hop addresses, wherein maintaining the single copy of the BGP prefix and each of the protocol next-hop addresses comprises installing only the single copy of the BGP prefix and each of the protocol next-hop addresses in a routing table of the network device such that the routing table does not include multiple copies of the BGP prefix;
    receiving, at the network device, a packet destined for a computing device that is reachable via at least one of the neighbors of the network device; and
    forwarding the packet to the one of the neighbors of the network device in accordance with the BGP prefix and the protocol next-hop address that identifies the one of the neighbors.

2. The method of claim 1, wherein the network device comprises a router running at a data center.

3. The method of claim 2, further comprising performing, by the router running at the data center, an Equal-Cost Multi-Path (ECMP) routing operation to facilitate load-balancing traffic at the data center; and
    wherein forwarding the packet to the one of the neighbors of the network device comprises forwarding the packet to the one of the neighbors of the network device to load-balance the traffic at the data center in accordance with the ECMP routing operation.

4. The method of claim 1, wherein maintaining the single copy of the BGP prefix and each of the protocol next-hop addresses comprises installing another single copy of the BGP prefix in another routing table of the network device such that the other routing table does not include multiple copies of the BGP prefix.

5. The method of claim 1, wherein removing the route information that identifies the AS path from the route update comprises preventing a routing loop that involves the first AS by removing, from the route update, the route information that identifies the AS path that leads to the first AS prior to sending the route update to the network device.

6. The method of claim 1, wherein removing the route information that identifies the AS path from the route update comprises removing, from the route update, route information that identifies all AS paths that lead to a particular destination except for a single preferred AS path that leads to the particular destination.

7. The method of claim 1, wherein sending the route update from the other network device to the network device comprises sending the route update to a plurality of network devices spanning a plurality of data centers.

8. The method of claim 1, wherein the other network device comprises a route reflector; and
    further comprising:
        establishing a BGP neighborship between the route reflector and a flow-monitoring server; and
        advertising, by the route reflector, the routes with at least one corresponding AS path to the flow-monitoring server to enable the flow-monitoring server to create at least one flow record in connection with the routes.

9. The method of claim 8, wherein creating the flow record in connection with the routes comprises:
    obtaining, at the flow-monitoring server, an address of a destination of the routes from the network device;
    identifying, at the flow-monitoring server, the AS path to which the routes correspond; and
    creating the flow record based at least in part on the address of the destination and the AS path to which the routes correspond.

10. The method of claim 9, further comprising monitoring, at the flow-monitoring server, traffic destined for the destination based at least in part on the flow record.

11. The method of claim 1, wherein the other network device comprises at least one of:
    a BGP controller;
    a route reflector; and
    a router.

12. A system comprising:
    a receiving module, stored in a memory at a network device, that receives, from another network device, a route update for one or more routes that direct traffic within a network that supports Border Gateway Protocol (BGP), wherein the other network device:
        determines that the network device is included in a first Autonomous System (AS) and the other network device in a second AS; and
        removes, from the route update, route information that identifies at least one AS path that is related to the routes and leads to the first AS;
        sends the route update to the network device upon removing the route information from the route update;
    an identification module, stored in the memory at the network device, that identifies, within the route update, a BGP prefix and a plurality of protocol next-hop addresses that:
        identify a plurality of neighbors of the network device; and
        each correspond to the BGP prefix;
    a maintenance module, stored in the memory at the network device, that maintains a single copy of the BGP prefix and each of the protocol next-hop addresses instead of maintaining a different copy of the BGP prefix for each of the protocol next-hop addresses by installing only the single copy of the BGP prefix and each of the protocol next-hop addresses in a routing table of the network device such that the routing table does not include multiple copies of the BGP prefix;

wherein the receiving module receives a packet destined for a computing device that is reachable via at least one of the neighbors of the network device;

a forwarding module, stored in the memory at the network device, that forwards the packet to the one of the neighbors of the network device in accordance with the BGP prefix and the protocol next-hop address that identifies the one of the neighbors; and at least one physical processor that is coupled to the memory and executes the receiving module, the identification module, the maintenance module, and the forwarding module.

13. The system of claim 12, wherein the network device comprises a router running at a data center.

14. The system of claim 13, further comprising a load-balancing module, stored in the memory at the router, that performs an Equal-Cost Multi-Path (ECMP) routing operation to facilitate load-balancing traffic at the data center; and wherein the forwarding module forwards the packet to the one of the neighbors of the network device to load-balance the traffic at the data center in accordance with the ECMP routing operation.

15. An apparatus comprising:

at least one storage device that stores a routing table for a network device; and at least one physical processing device that is communicatively coupled to the storage device at the network device, wherein the physical processing device:

receives, from another network device, a route update for one or more routes that direct traffic within a network that supports Border Gateway Protocol (BGP) wherein the other network device:

determines that the network device is included in a first Autonomous System (AS) and the other network device in a second AS; and removes, from the route update, route information that identifies at least one AS path that is related to the routes and leads to the first AS;

sends the route update to the network device upon removing the route information from the route update;

identifies, within the route update, a BGP prefix and a plurality of protocol next-hop addresses that:

identify a plurality of neighbors of the network device; and each correspond to the BGP prefix;

maintains a single copy of the BGP prefix and each of the protocol next-hop addresses instead of maintaining a different copy of the BGP prefix for each of the protocol next-hop addresses, wherein maintaining the single copy of the BGP prefix and each of the protocol next-hop addresses comprises installing only the single copy of the BGP prefix and each of the protocol next-hop addresses in the routing table of the network device such that the routing table does not include multiple copies of the BGP prefix;

receives a packet destined for a computing device that is reachable via at least one of the neighbors of the network device; and forwards the packet to the one of the neighbors of the network device in accordance with the BGP prefix and the protocol next-hop address that identifies the one of the neighbors.

\* \* \* \* \*